United States Patent
Atkeisson et al.

[11] Patent Number: 5,822,482
[45] Date of Patent: Oct. 13, 1998

[54] FIBER OPTIC COUPLER PACKAGE WITH STRAIN RELIEF AND PACKAGING METHOD

[75] Inventors: Randal A. Atkeisson, Phoenix; Karl A. Fetting, Glendale, both of Ariz.

[73] Assignee: Honeywell Inc., Minneapolis, Minn.

[21] Appl. No.: 632,745

[22] Filed: Apr. 15, 1996

Related U.S. Application Data

[63] Continuation of Ser. No. 148,047, Nov. 5, 1993, abandoned.

[51] Int. Cl.⁶ ..................................... G02B 6/38
[52] U.S. Cl. ................... 385/51; 385/96; 385/99
[58] Field of Search ............... 385/135, 39, 43, 385/50, 51, 65, 83, 95, 96, 99

[56] References Cited

U.S. PATENT DOCUMENTS

| | | | |
|---|---|---|---|
| 4,647,146 | 3/1987 | Karr, III, et al. | 385/51 |
| 4,726,643 | 2/1988 | Imoto et al. | 385/51 |
| 4,824,198 | 4/1989 | Anderton | 385/135 |
| 5,042,901 | 8/1991 | Merriken et al. | 385/135 |
| 5,240,489 | 8/1993 | Robson | 385/51 |
| 5,295,219 | 3/1994 | Koya et al. | 385/96 |
| 5,625,730 | 4/1997 | Ishokawa et al. | 385/49 |
| 5,647,034 | 7/1997 | Matsuda et al. | 385/16 |

FOREIGN PATENT DOCUMENTS

| | | | |
|---|---|---|---|
| 62-102206 | 5/1987 | Japan | 385/51 |
| 2-170102 | 6/1990 | Japan | 385/51 |

*Primary Examiner*—John Ngo
*Attorney, Agent, or Firm*—John G. Shudy, Jr.

[57] ABSTRACT

A method of packaging a fiber optic coupler formed of a plurality of optical fibers having a coupled region at which electromagnetic waves are coupled therebetween and at least one lead portion extending from the coupled region. A protective body is provided having a receiving space therein. The coupled region and a portion of the at least one lead portion are positioned within the receiving space. A slack in the at least one lead portion is created by affixing two points of the portion of the at least one lead portion to said protective body. The slack is created between the two points.

11 Claims, 2 Drawing Sheets

FIBER OPTIC COUPLER PACKAGE WITH STRAIN RELIEF AND PACKAGING METHOD

This application is a continuation of application Ser. No. 08/148,047 filed Nov. 5, 1993, abandoned.

FIELD OF THE INVENTION

The present invention pertains generally to fiber optic couplers. More particularly, the present invention relates to a package design for a fiber optic coupler.

BACKGROUND OF THE INVENTION

A fiber optic coupler is used in optical fiber interconnection arrangements to couple electromagnetic waves from one of two or more optical fibers to another optical fiber in the group. Alternatively, the coupler may couple one optical fiber to itself to form a loop. Such couplers have been used in optical communications, optical sensors and fiber optic gyroscopes. A fiber optic coupler is formed by fusing and tapering two or more optical fibers together. The fabrication usually involves aligning principle axes of two or more optical fibers after removing a portion of a protective jacket on the optical fibers. They are then brought together and heated to fuse and taper the optical fibers resulting in a fused and tapered coupled region for coupling of optical power.

Fiber optic couplers are very sensitive to environmental influences because the optical material of which the optical fibers are made is very fragile. In addition, the coupling region is not provided with a jacket so adverse environments influence the quality of the optical material of the fiber optic coupler and/or the signals transmitted through the fiber optic coupler. Therefore, the optical signal processing performance of a fiber optic coupler in various environments typically depends upon the type of housing or package in which it is positioned for protection and on the method used to assemble the packaged fiber optic coupler. A problem with fused fiber optic couplers is latent failure of the coupler fiber or fibers inside the coupler enclosure or package due to stresses induced on the fiber from abuse such as pulls, tugs, jerks and yanks on the fiber from outside of the coupler package. The fused and tapered portions of the coupler where the transfer of optical power takes place is structurally weak and sensitive to such abuse, in addition to changes in environmental conditions.

Packaging techniques which have been used to protect the fiber optic coupler from such deleterious influences include the use of quartz glass tubes as protective covering and as a support for the coupled region of a fiber optic coupler. In such an arrangement, the coupled region is typically placed within a central open portion of a slotted quartz glass tube and epoxy is applied at the ends of the tube to secure the optical fibers extending therefrom and the coupled region to the tube. However, difficulties arise in environments in which substantial shock or vibration occur because of the resulting material movements of the coupled region of the fiber optic coupler suspended in the central open portion of the tube.

In part, the above difficulties have been overcome by placing the fibers within the slotted glass tube and then heating the mid-region of the tube until it collapses about the fiber by stretching the tube to reduce the diameter thereof. This method places the tube in direct contact with the optical fibers and the coupled region of the fiber optic coupler, thereby providing rigid support to the coupled region. However, this places additional stress on the coupled region causing losses and other difficulties.

Techniques such as those discussed above for packaging fiber optic couplers leave much to be desired for protecting the coupler from abuse. This protection is especially lacking where the fiber optic coupler and the packaging thereof are often subjected to pulls, jerks, etc., and/or to vibrations or impacts of controlled magnitudes. Thus, it has been observed that the failure or breakage rate of fiber optic couplers encased in such manners, presents a severe limitation to the use of such packaged fiber optic couplers in communication applications. Therefore, an improved package and packaging method for fiber optic couplers is desired.

SUMMARY OF THE INVENTION

The present invention includes a method of packaging a fiber optic coupler formed of a plurality of optical fibers. The plurality of optical fibers have a coupled region at which electromagnetic waves are coupled therebetween, and at least one lead portion extending from the coupled region. A protective body is provided having a receiving space therein. The coupled region and a portion of the at least one lead portion is positioned within the receiving space. A slack is created in the at least one lead portion by affixing two points of the portion of the at least one lead portion to the protective body. The slack is created between the two points.

A fiber optic coupler assembly is also provided in accordance with the present invention. The fiber optic coupler assembly includes a plurality of optical fibers having a coupled region at which electromagnetic waves are coupled therebetween and at least one lead portion extending from the coupled region. The coupler assembly further includes a protective body having a receiving space with at least one entrance region thereto for positioning the coupled region therein. First adhesive means affixes at least a first portion of the lead portion adjacent to the coupled region at a first position of the protective body. Second adhesive means affixes a second portion of the at least one lead portion at a second position of the protective body at about the entrance region. A length of the at least one lead portion between the first and second position is greater than the distance between the first and second position creating a slack in the at least one lead portion within the receiving space between the first and second position.

In a further embodiment of the apparatus of the present invention, the protective body includes a rectangular body. The receiving space of the rectangular body includes a longitudinal channel along the rectangular body for receiving the coupled region and at least one shaped channel extending from the longitudinal channel terminating in the at least one entrance region for positioning of the slack in the at least one lead portion. The at least one lead portion emerges from the at least one entrance region.

DETAILED DESCRIPTION OF THE PREFERRED EMBODIMENT

Figure 1:
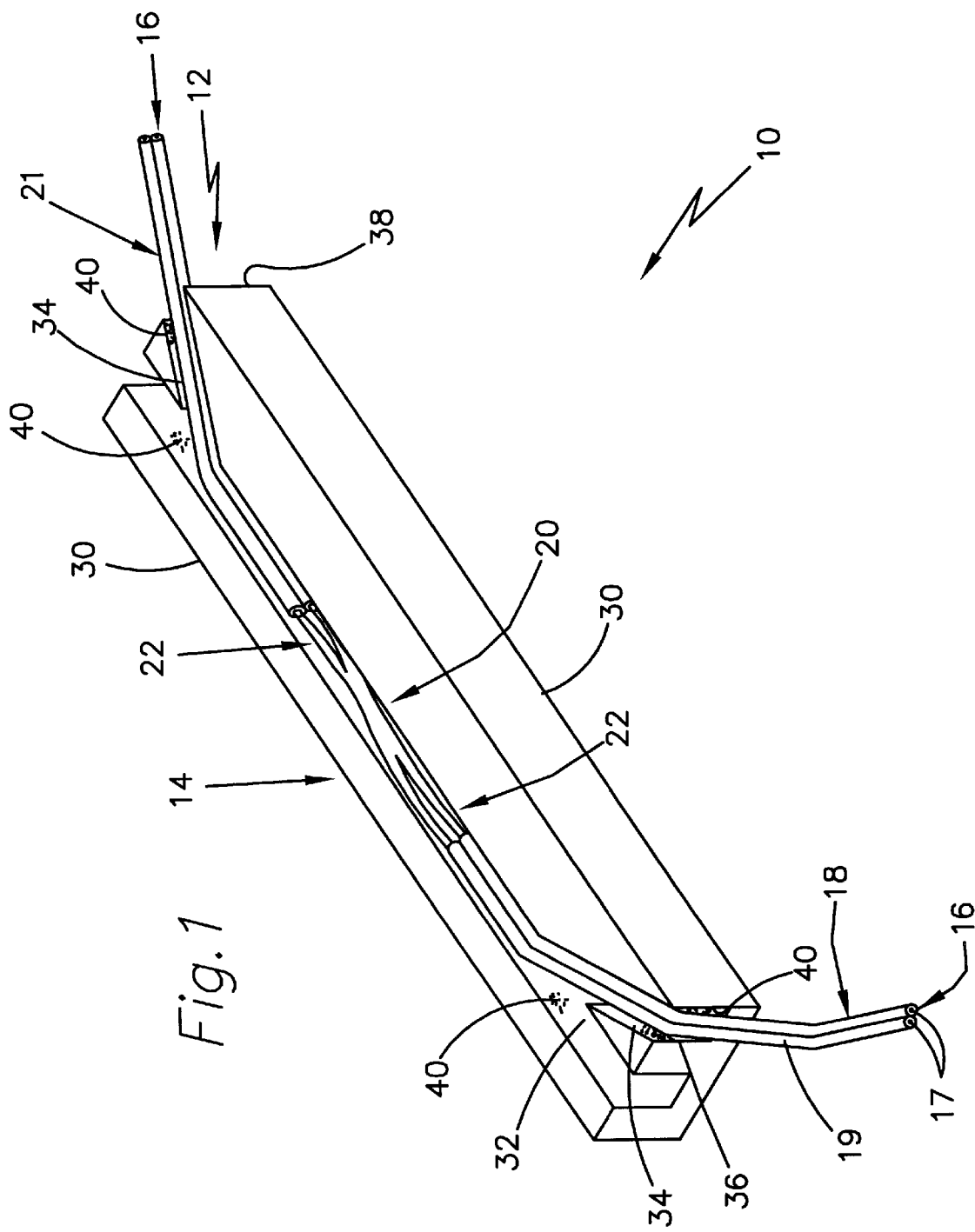
FIG. 1 shows a perspective view of a fiber optic coupler assembly.
Figure 2:
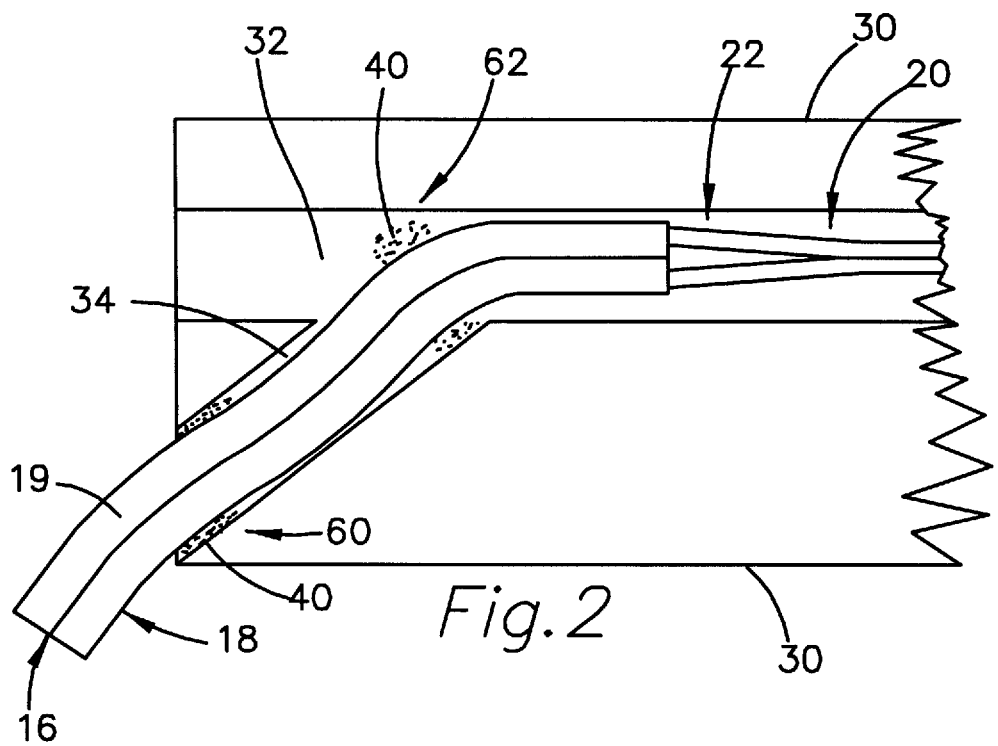
FIG. 2 shows an enlarged partial top view of the fiber optic assembly of FIG. 1.

A fiber optic coupler assembly 10 and method of packaging a fiber optic coupler shall be described with reference to FIGS. 1 and 2. In general, fiber optic coupler assembly 10 creates slack zones of fiber inside the coupler package 14 such that forces exerted externally on the optical fibers 16 are dissipated by removing the slack in the zone. Thus, the forces are kept from reaching the most vulnerable region, the coupled region 20, of the fiber optic coupler 12. The fiber optic coupler assembly 10 also creates an "angled" entrance for the input and output jacketed lead portions 18,21. This enhances installation of the fiber optic coupler assembly 10 in restricted areas.

The fiber optic coupler assembly 10 includes fiber optic coupler 12 and coupler package 14. Fiber optic coupler 12 includes optical fiber 16 having a jacket 19 thereon about fiber portions 17. A portion of the jacket 19 is removed from a section of the optical fibers such that a coupled region 20 is formed by a fusing and tapering process. Such process may include any one of a number of techniques for creating the coupled region 20 known to those skilled in the art; the coupled region 20 allowing for coupling of optical power.

The fiber optic coupler 12 after removal of the jacket and creation of the coupled region 20, includes input and output jacketed lead portions 18, 21, coupled region 20, and jacketless lead portions 22. As indicated in the Background of the Invention section herein, the fiber 17 of the fiber optic coupler 12 inside conventional coupler packages incur problems of latent failure due to stresses induced on the fiber 17 from pulls, tugs, jerks and yanks on the fiber from outside of the coupler package. In order to counter such problems, the present invention provides a special manner of packaging.

The coupler package 14 includes a protective body 30. In the preferred embodiment, the protective body 30 includes a quartz glass block, in particular a rectangular block. The protective body 30 has a longitudinal channel 32 provided along the entire length of the protective body 30. It is typically provided by cutting the protective body 30 along its direction of elongation with a diamond saw. In the preferred embodiment, angled channels 34 are also provided in the protective body 30 at a predetermined angle with the longitudinal channel 32. Likewise, these channels are typically provided by cutting with a diamond saw. The angled channels 34 allow the fiber optic coupler assembly 10 to be shaped such that the input and output jacketed lead portions 18,21 emerge from a first end 36 and a second end 38 of the protective body 30 in a manner to enhance the installation of the fiber optic coupler assembly 10 in certain restricted areas for certain applications. It should be readily apparent to one skilled in the art that the angled channels 34 may be of any predetermined angle with longitudinal channel 32 and may be in any other geometrical shape extending from longitudinal channel 32 as appropriate for installation in various applications.

Longitudinal channel 32 and angle channels 34 allow fiber optic coupler 12 to be positioned therein. The openings at first end 36 and second end 38 of protective body 30 allow for emergence of jacketed lead portions 18,21 therethrough. The fiber optic coupler assembly 10 includes a rigid structural adhesive 40 securing the jacketed lead portions 18 at the openings of first end 36 and second end 38. In addition, a rigid structural adhesive 40 is also placed at a position closer to coupled region 20 to secure the fiber optic coupler 12 at these positions. As best shown in FIG. 2, the rigid structural adhesive 40 is placed at a first position 62 and then at second position 60. The jacketed lead portion 18 is positioned on the adhesive such that the length of optical fiber 16 is greater than the actual distance between the first and second positions, thereby creating a slack zone of fiber therebetween. This slack zone of fiber inside the coupler package 14 is such that forces exerted externally on the fibers are dissipated by removing the slack in the zone.

It should be readily apparent to one skilled in the art that the rigid structural adhesive 40 may be positioned at two points anywhere between the opening at first end 36 and the coupled region 20. Therefore, it is readily apparent that the rigid structural adhesive may be applied to the jacketless lead portion 22 as well as the jacketed lead portion 18.

Figure 3:
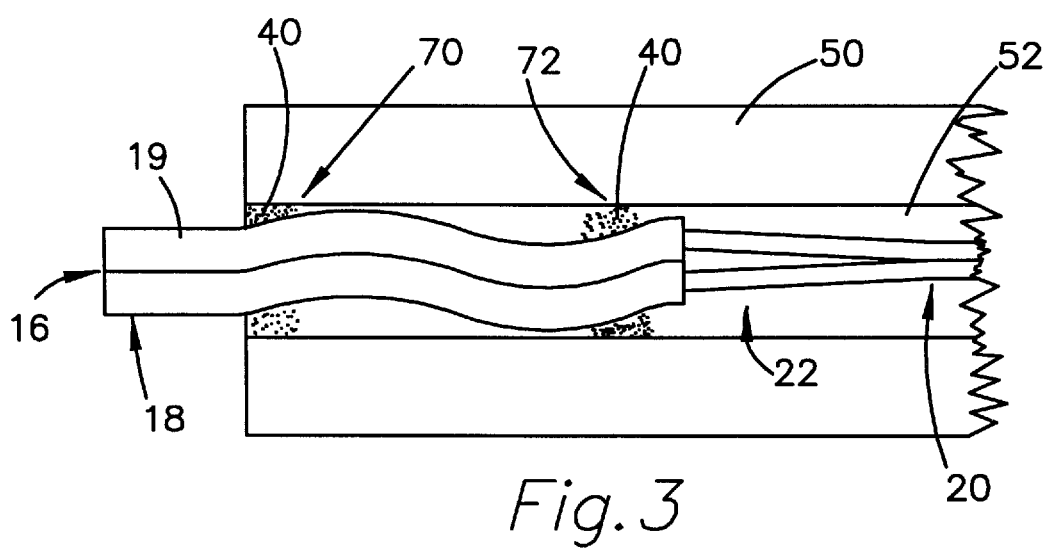
FIG. 3 shows a partial enlarged top view of an alternative embodiment of the present invention.

One skilled in the art will readily recognize as shown in FIG. 3, that a protective body 50, being a quartz glass tube or rod, and having only a longitudinal channel 52 may be utilized. A slack zone is still created by placing an adhesive 40 at a first position 72 and then an adhesive 40 at a second position 70 in order to secure the optical fibers 16 to the protective body 50. The slack zone is then created in the single longitudinal channel 52 between positions 70 and 72.

In accordance with the method of the present invention, the fiber optic coupler assembly 10 is formed by providing the protective body 30 with the channels 32, 34 cut therein. The protective body, as previously mentioned, also includes the openings at first end 36 and second end 38. The protective body 30 is then thoroughly cleaned in an ultrasonic acetone bath followed by multiple rinsings of methanol and distilled water without drying between rinsings. Thus, contaminants from its surfaces are removed. The protective body 30 is then blown dry with nitrogen gas. The protective body 30, now cleaned, is immediately used in forming the fiber optic coupler assembly 10. Such cleaning is readily known to one skilled in the art and variations in the cleaning process are contemplated in accordance with the present invention.

The fiber optic coupler 12 including jacketed lead portions 18, 21, coupled region 20 and jacketless lead portions 22 is then prepared for insertion into the receiving space or channels 32, 34 of protective body 30. The coupled region 20 of fiber optic coupler 12 is positioned in the longitudinal channel 32 and input lead portions and output lead portions extending from the coupled region 20 are positioned in the angled channels 34 with the input jacketed lead portion 18 extending or emerging from the openings at first end 36 and output jacketed lead portion 21 emerging from the opening at second end 38.

Prior to positioning the fiber optic coupler 12 in the channels 32,34, the rigid structural adhesive 40 is positioned at the points between which the slack zones are to be created. As shown in FIG. 1, the adhesive for the input lead portion 18 is placed at the opening of first end 36 and at a position where the angled channel 34 meets the longitudinal channel 32. The adhesive 40 for the output portion 21 is placed at the opening of second end 38 and at a position where the other angled channel 34 meets longitudinal channel 32. The fiber optic coupler is then positioned within the channels 32,34 such that the length of optical fiber 16 between the two positions on each end where the rigid structural adhesive 40 is placed is greater than the distance between the two positions. Thus, the slack zones are created. With the rigid structural adhesives 40 securely anchoring the fiber optic coupler 12 to the protective body 30, the slack zones, for example, between the points 60 and 62, keep the forces of externally applied abuse from reaching the coupled region 20 which is the most vulnerable portion of the fiber optic coupler 12. With the rigid structural adhesive in place and the fiber optic coupler positioned within the coupler package 14, the adhesive is then cured. The fiber optic coupler 12 is then suspended within the receiving space of the protective body 30 such that the coupled region 20 does not contact the protective body 30.

The rigid structural adhesive 34 may be ELC4481, available from Electro-Lite Corporation of Danbury, Conn.

ELC4481 is an ultraviolet light curable adhesive. In addition, the rigid structural adhesive may be EPO-TEK®354, a high temperature epoxy available from Epoxy Technology, Inc.®, Billerica, Mass. EPO-TEK®354 is a thermally cured adhesive. Both EPO-TEK®354 or ELC4481 may either surround the jacketed or jacketless lead portions within the receiving space of protective body in whole or partially. As such, the rigid structural adhesive may be utilized only on the bottom of the lead portions between the lead portions and protective body.

The second fixation positions creating the slack zones may be provided by encapsulating the entire coupled region 20, jacketless lead portions 22 and a portion of jacketed lead portions 18 with a silicon support material which is resilient and has an index refraction less than that of the coupled region. As such, the two slack zones would be created by affixing the optical fiber 16 at the opening of first end 36 and affixing optical fiber 16 at the opening of second end 38. The entire encapsulated coupled region and adjacent areas would then provide for attachment of the lead portions at the second positions, such as position 62, so as to create the slack zones between the first and second positions.

The coupler package 14 may also include an outer protective material (not shown) such as a shrink wrap tubing which will provide additional environmental protection for the fiber optic coupler assembly 10. Any number of protective materials are available and may be utilized to serve such secondary protective function.

Those skilled in the art will recognize that only preferred embodiments of the present invention have been disclosed herein, other advantages may be found and realized, and various modifications may be suggested by those versed in the art. It should be understood that the embodiment shown herein may be altered and modified without departing from the true spirit and scope of the invention as defined in the accompanying claims.

What is claimed is:

1. A fiber optic coupler assembly, comprising:

a plurality of optical fibers having a coupled region at which electromagnetic waves are coupled therebetween and at least one lead portion extending from said coupled region;

a protective body having a receiving space with at least one entrance region thereto for positioning said coupled region therein;

first adhesive means for affixing a first portion of said at least one lead portion adjacent to said coupled region at a first position of said protective body, said first adhesive means not in contact with said coupled region; and second adhesive means for affixing a second portion of said at least one lead portion at a second position of said protective body at about said entrance region such that a length of said at least one lead portion between said first and second position is greater than a distance therebetween creating a slack in said at least one lead portion within said receiving space between said first and second position, said slack suitable for relieving stress on said at least one lead portion.

2. An apparatus according to claim 1, wherein said receiving space includes a channel along said protective body for positioning said coupled region therein with a first and second entrance region at opposite ends thereof, said at least one lead portion including an output lead portion and an input lead portion oppositely extending from said coupled region and emerging from said first and second entrance regions, respectively.

3. An apparatus according to claim 1, wherein said protective body portion includes a quartz glass tube.

4. An apparatus according to claim 2, wherein said first adhesive means and said second adhesive means affixes said input and output lead portions to said protective body so as to create a first slack in said input lead portion at said first entrance region and a second slack in said output lead portion at said second entrance region.

5. An apparatus according to claim 1, wherein said protective body includes a rectangular body, said receiving space thereof including a longitudinal channel along said rectangular body for receiving said coupled region and at least one shaped channel extending from said longitudinal channel terminating in said at least one entrance region for positioning of said slack in said at least one lead portion, said at least one lead portion emerging from said at least one entrance region.

6. An apparatus according to claim 5, wherein said at least one shaped channel includes an angled channel extending at a predetermined angle to said longitudinal channel.

7. An apparatus according to claim 1, wherein said first adhesive means includes support material at least partially about said coupled region and extending in said receiving space to said protective body, said support material being resilient and having an index of refraction less than that of said coupled region.

8. An apparatus according to claim 1, wherein said optical fibers have a protective jacket thereon, a portion of said protective jacket is removed from said optical fibers forming a jacketless region, said jacketless region including said coupled region, a jacketless output lead portion and a jacketless input lead portion oppositely extend from said coupled region, jacketed input and output lead portions extend from said unjacketed input and output lead portions, respectively, emerging from a first and second entrance region of a channel defining said receiving space, said first adhesive means affixing at least a portion of said jacketless input and output lead portion to said primary protective body and said second adhesive means affixing said jacketed portion of said input and output lead portions to said protective body at said first and second entrance regions, respectively, such that a first slack is created in said optical fibers near said first entrance region and a second slack is created in said optical fibers near said second entrance region.

9. A method of packaging a fiber optic coupler formed of a plurality of optical fibers having a coupled region at which electromagnetic waves are coupled therebetween and at least one lead portion extending from said coupled region, said method comprising the steps of:

providing a protective body having a receiving space therein;

positioning said coupled region within said receiving space, said receiving space having at least one entrance region with said at least one lead portion emerging therefrom;

affixing a first portion of said at least one lead portion adjacent said coupled region to said protective body at a first position without contacting adhesive to said coupled region; and affixing a second portion of said at least one lead portion to said protective body at a second position at said entrance region such that a length of said at least one lead portion between said first and second position is greater than a distance between said first and second position creating a slack suitable for relieving stress on said at least one lead portion.

10. A method according to claim 9, wherein a said optical fibers have a protective jacket thereon, a portion of the protective jacket is removed from said optical fibers forming a jacketless region, said jacketless region including said coupled region and a jacketless portion of said at least one lead portion adjacent and integral to said coupled region resulting in a jacketed lead portion integral and extending from said unjacketed lead portion, said jacketed lead portion emerges from said receiving space at said at least one entrance region, said unjacketed lead portion and said jacketed lead portion being affixed to said protective body at said first and second position, respectively.

11. A method of packaging a fiber optic coupler formed of a plurality of optical fibers having a coupled region at which electromagnetic waves are coupled therebetween and at least one lead portion extending from said coupled region, said method comprising the steps of:

provㅇiding a protective body having a receiving space therein;

positioning said coupled region and a portion of said at least one lead portion within said receiving space;

creating a slack in said at least one lead portion by affixing two points of said portion of said at least one lead portion to said protective body without affixing said coupled region, said slack being created therebetween said slack suitable for relieving stress in said at least one lead portion.

* * * * *